United States Patent
Maury et al.

[11] Patent Number: 5,409,320
[45] Date of Patent: Apr. 25, 1995

[54] BALL-AND-SOCKET JOINT AND METHOD FOR THE ASSEMBLY THEREOF

[75] Inventors: Horst Maury, St. Sebastian; Dieter Henke, Hankensbuttel, both of Germany

[73] Assignee: Stabilus GmbH, Koblenz-Neuendorf, Germany

[21] Appl. No.: 112,666

[22] Filed: Aug. 26, 1993

[30] Foreign Application Priority Data

Aug. 26, 1992 [DE] Germany .......... 42 28 383.3

[51] Int. Cl.⁶ .......... F16C 11/00; F16D 1/12
[52] U.S. Cl. .......... 403/77; 403/66; 403/122
[58] Field of Search .......... 403/74, 76, 77, 65, 403/66, 122, 131

[56] References Cited

U.S. PATENT DOCUMENTS

| Re. 31,635 | 7/1984 | Smith et al. | |
|---|---|---|---|
| 2,974,986 | 3/1961 | Hazard | 403/76 |
| 3,408,124 | 10/1968 | Melton et al. | 403/131 |
| 3,537,735 | 11/1970 | Hawk | 403/76 |
| 3,803,685 | 4/1974 | Muhn | 403/76 X |
| 5,069,571 | 12/1991 | Matczak et al. | 403/131 X |
| 5,112,153 | 5/1992 | Gunn et al. | 403/77 X |
| 5,152,628 | 10/1992 | Broszat et al. | 403/122 X |

FOREIGN PATENT DOCUMENTS

| 2568958 | 2/1986 | France | 403/122 |
|---|---|---|---|
| 2942800 | 5/1980 | Germany . | |

Primary Examiner—Edward K. Look
Assistant Examiner—Hoang Nguyen
Attorney, Agent, or Firm—Brumbaugh, Graves, Donohue & Raymond

[57] ABSTRACT

A ball socket body (16) of a ball-and-socket joint has an exterior surface (18) and a ball-receiving channel (20). The receiving channel (20) has a channel axis (P—P), an insertion opening (22), an interior circumferential surface (24), an interior end support (26) and ball-securing elements (32). The ball socket body (16) may be made of one piece with the securing cam (32) and may also have a passage (30) opening through the back exterior surface thereof to make a ball head (10) located in the ball socket body (16) accessible to a tool. The ball head (10) is provided with a tool engagement point (10b) for reception of the tool. By use of the tool, the ball head (10) may readily be fastened to a support structure even though the ball head (10) has already been assembled with the ball socket body (16).

33 Claims, 8 Drawing Sheets

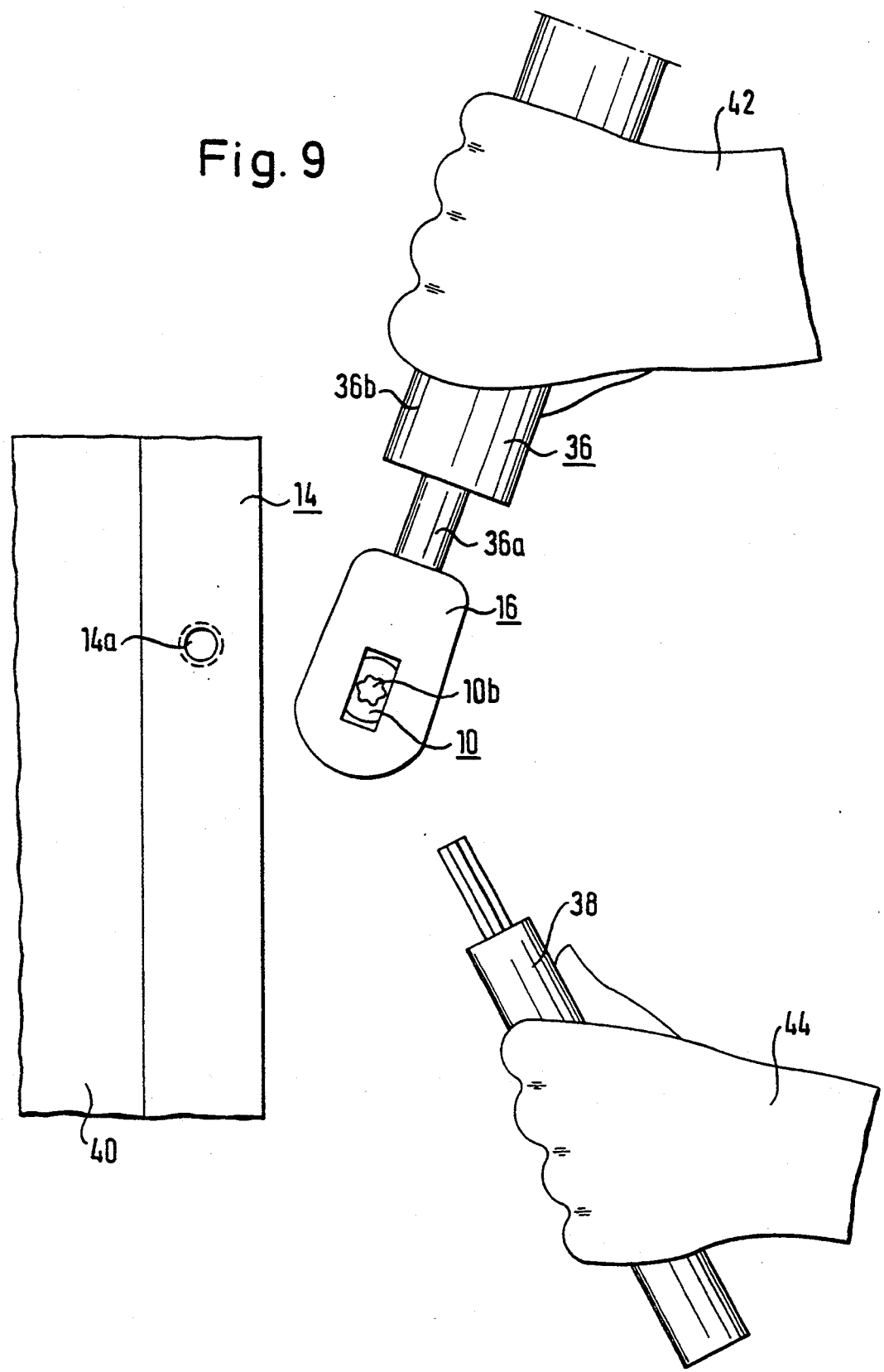

BALL-AND-SOCKET JOINT AND METHOD FOR THE ASSEMBLY THEREOF

BACKGROUND OF THE INVENTION

The invention relates primarily to a ball-and-socket joint of the type having a ball head, which can be fastened to a ball head support and a ball socket body, for receiving the ball head in a rotatable manner and which has an exterior surface and a receiving channel. The receiving channel has longitudinal axis, an insertion opening for receiving the ball head, an interior circumference surface for the ball head to rest on, an interior end support as the insertion boundary for the ball head and securing elements which secure the ball head against being pulled out of the receiving channel.

Such a ball-and-socket joint is known, for example, from German Patent DE-PS 29 42 800. In this known ball-and-socket joint, the ball socket body is closed on the back of its exterior surface remote from the insertion opening. A C-shaped securing spring extends across the back area in a longitudinal sectional plane of the ball socket body containing the axis of the receiving channel and its free end sections enter through lateral slits in the ball socket body. Customarily, assembly takes place by first fastening the ball head on a generic structure, for example, on the body or a trunk lid of a motor vehicle, and then locking the ball socket body (as a part of a gas spring) on the ball head. For this purpose the C-shaped securing spring is placed in a secured position on the ball socket body prior to the connection of the ball socket body to the gas spring. The subsequent connection of the ball socket body with the ball head pre-assembled on the generic structure then takes place by pushing ball socket body onto the ball head so that the end sections of the C-shaped securing spring are urged by the ball head back out of the lateral slits in the ball socket until the end sections of the C-shaped securing spring snap back into the receiving channel and grip the ball from behind. In this way, the C-shaped spring secures the ball socket body against lifting off the ball head.

The assembly of a ball-and-socket joint itself and the application of the ball-and-socket joint to parts of a generic structure must take place in as ergonomically simple a manner as possible, in particular during assembly line production, to minimize lost time and assembly costs. The simplest, and thus the fastest, manner of assembling the ball-and-socket joint and application of the ball-and-socket joint to the parts of a generic structure is decisively determined by the spatial and access conditions at the generic structure. The assembly situations can be very different from one type of structure to the next.

It has now been determined that under certain assembly conditions installation can be made considerably easier if the ball head is fastened to the ball head support (generic structure) after the ball head has already been received in the working position in the ball socket body. In this case, it is possible to utilize the ball socket body or a structural part already connected with the ball socket body, for example the cylinder or the piston rod of a gas spring, as a support means, so to speak, for bringing the ball head attached thereto into the fastening position in relation to the ball head support.

In addition, although the ball-and-socket joint disclosed in German Patent DE-PS 29 42 800 has proven itself in a very large number of applications, certain problems, in particular corrosion problems, have occurred because the C-shaped securing spring (made of spring steel) cannot be produced at all or only at unwarranted cost to be sufficiently corrosion-proof so that corrosion effects are eliminated over extended operational times and in corrosion-sensitive atmospheres. Added to this is that with the known embodiment in accordance with German Patent DE-PS 29 42 800, the application of the C-shaped securing spring to the ball socket support is relatively difficult and in particular can only be realized by means of a large force.

SUMMARY OF THE INVENTION

Based on the foregoing, it is proposed in accordance with the present invention to provide a ball-and-socket joint of the type in which the ball socket body has a passage which connects the ball-receiving channel with an area of the exterior surface of the ball socket body remote from the insertion opening, and structure is provided on the ball head for a tool to be applied, which structure is accessible to the tool through the passage.

Further possibilities for fastening the ball head on the ball head support also ensue, wherein the passage connects the ball-receiving channel in the area of the channel axis with a back of the exterior surface of the ball socket body remote from the ball-insertion opening.

The type of fastening can be greatly varied. For example, a resistance welding electrode could be applied to the ball head through the tool passage, thereby permitting the ball head to be welded to the ball head support (a second welding electrode is applied to the latter in this case). Again, a rivet block could be brought through the passage of the ball socket body to the ball head in order to rivet the ball head, while it is held in the riveting position above the ball socket body, to the ball head support.

In a preferred embodiment, the ball head is designed to be fastened on the ball head support by means of a rotating movement and the point of application of the tool is adapted for the action of a rotating tool. In this case, the rotating tool may be a conventional screw driver. Preferably a rotating tool is used, so that after insertion of the rotating tool to the tool application structure on the ball head, a readjustment of the ball head relative to the application point on the ball head support is possible with the aid of the rotating tool before beginning the rotating action for the purpose of fastening the ball head to the ball head support. For example, this possibility is available if the tool application point is designed to have a hexagonal recess or a Torx recess and the rotating tool is formed as a corresponding polygonal rod. In this case the ball head is exactly oriented angularly with respect to the rotating tool when the rotating tool is inserted into the ball head, so that subsequently the ball head can readily be brought into the correct engagement orientation with respect to the application point of the ball head support, such as a threaded bore, by means of an orientation correction through use of the tool. Motor-driven rotating tools in particular are suitable as rotating tools.

Preferably, the ball head is equipped with a ball head shaft which has an exterior thread and is inserted in an interiorly threaded bore of the ball head support. In such embodiment, the tool application point will preferably be placed at a point on the ball head which is opposite the threaded shaft in the direction of the shaft axis and in alignment with the axis of the ball head shaft.

It should be noted that, although, in accordance with the invention, the provision of the passage in the ball head affords additional fastening possibilities for controlling certain fastening processes which otherwise could only be solved with difficulty, the presence of the tool passage in no way inhibits fastening being effected in the classic way, i.e. by first attaching the ball head on a generic structure and then locking the ball socket body to the ball head. Indeed, even in conventional fastening process, the tool application point in the back of the ball head can also be helpful in the fastening process. However, it is also possible to provide fastening in the conventional manner by applying a wrench to flanges or polygonal profiles of the ball head shaft which are provided in the transition area between the ball head and the ball head shaft.

In accordance with a further aspect of the invention, it is an object of the invention to provide a ball-and-socket joint of the previously mentioned type in such a way that the application of the securing means is made easier and that corrosion problems are removed. In this connection, it should still be assured that the assembly of the ball socket body on the ball head remains relatively simple and that the unintended separation of the ball socket body from the ball head is prevented even under large separation forces. To attain this object the securing means should be formed by at least one securing cam made integrally with the ball socket body which, beginning at the interior circumferential surface of the receiving channel, grips the ball head from behind and which is elastically movable in such a way that it permits passage of the ball head when it is inserted into the receiving channel. This novel construction of the ball socket body avoids any parts which are sensitive to corrosion, because both the ball socket body itself and the securing cam(s) may be extruded or cast of plastic. The embodiment with such a securing cam is not limited to the presence of a tool passage. However, there is an advantageous relationship between the securing cam and the tool passage, in that the tool passage considerably eases the manufacture by means of casting or injection technology of the securing cam(s). There is a further relationship in that in the course of applying a securing cam to the interior circumferential surface of the receiving channel, as a rule it is fairly difficult outside of a specially equipped manufacturing plant to place the ball socket body on the ball head with the required great security against separation forces. With the simultaneous presence of an extruded or cast cam, on the one hand, and a tool passage through the ball socket body, on the other hand, a synergistic effect occurs in that the manufacture of the ball socket body is made easier, that the combination of the ball head with the ball socket body (which poses no problems in the manufacturing plant) can be performed easily and inexpensively, and furthermore that there is the sometimes very much desired possibility of being able to apply the ball head easily to a ball head support by using the ball socket body as a positioning means.

Because the ball socket body and the securing cam are made of a relatively hard and elastic material, e.g., plastic, in order to achieve the required sturdiness- and in particular for achieving a large separation force—the elastic deformation occurring in the course of insertion of the ball head into the ball head-receiving channel will, as a rule, not only be an elastic deformation of the securing cam in respect to the ball socket body but also a certain deformation of the ball socket body itself.

Such deformation of the body must be taken into consideration when selecting the body material. Alternatively, the securing cam(s) may be configured to be elastic in their shape with respect to the ball socket body by virtue of an appropriate shaping, e.g. weakened places, so that a considerable deformation of the ball head body during the insertion of the ball head into ball head-receiving channel does not occur and instead only an elastic deformation of the securing cam(s) with respect to the ball socket body occurs.

It is advantageous if two securing cams are located essentially diametrically opposite of each other in a cross-sectional plane which is orthogonal relative to the channel axis. With this embodiment, a large separation force is achieved, with dependable securing of the ball head to the ball socket body against pull-out forces. Also, a universal mobility of the ball socket body with respect to the ball head is achieved. It should be noted here that the ball socket body should be rotatable with respect to the ball head not only around a common axis of the ball head-receiving channel and the ball head, but that in addition a wobbling ability of the ball socket body should be possible with respect to the ball head around all possible lateral axes that are orthogonal to the axis of the ball head and to the axis of the ball head-receiving channel.

To provide an intimate and close seating over a large surface between the securing cam and the ball head, it is advantageous if the securing cam(s) has a concave contour towards the channel axis, at least in the area of the cross-sectional plane which is orthogonal to the channel axis and intersects the cam(s) where it has the closet spacing to the channel axis.

In addition, it is advantageous for achieving a separating force (pull-out force) of sufficient magnitude if a securing cam, considered in a longitudinal sectional plane contained in a channel axis which intersects it, is provided with a profile tip pointing towards the channel axis, and particularly at a central place of its circumferential extension around the channel axis. In this connection it is also desirable that the securing cam, considered in the longitudinal sectional plane which intersects it, is concave towards the channel axis in a profile area extending in the direction toward the end supports which follow the profile tips.

To make the assembly of the ball head and the ball socket body easier, while always paying attention to the requirement for a large separating force, it is preferably that the securing cams, considered in the longitudinal sectional plane which intersects them, be provided with a ball run-up ramp in a profile section extending in the direction towards the insertion opening and following the profile tip.

A further easing of assembly of the ball head and the ball socket body is made possible if the insertion opening is formed with an insertion ramp on at least a portion of its circumference.

The opposing requirements for a high separating force, on the one hand, and easy assembly of the ball head and the ball socket body, on the other hand, can be simultaneously met if the ball-receiving channel, considered in the cross sectional planes orthogonal to the channel axis, has an oval cross section over at least a portion of its axial extent. A short axis of the respective oval cross section lies in a longitudinal sectional plane containing the channel plane and intersecting the securing cams, and the long axis of the respective oval cross section is larger than the diameter of the ball head. With such an embodiment, it is easily possible during assembly to compress the ball socket body in the direction of the long axis of the respective oval cross section by means of a clamping tool. This compression effect results in an increase of the distance between the securing cams in the direction of the short axis of the respective oval cross section and thus in an eased ability to insert the ball head into the ball head-receiving channel. If this type of assembly is desired, it is preferable as a rule to ensure that the long axis of the respective oval cross section is larger than the diameter of the ball head, because particularly in this case a shortening of the long axis because of the compression and, at the same time, a lengthening of the short axis creates a change in the distance between the cams. In the course of all considerations of sizes, it is of course necessary to account for the unavoidable tolerances in the manufacturing of the ball heads as well as in the manufacturing of the ball socket body. As a result, the long axis of the oval cross section should be sized so as, at the minimum, to be at least equal to, but preferably greater than, the ball head diameter. The deformability of the ball-receiving channel for the purpose of ease in inserting the ball head is even further eased if, on the one hand, it is provided (a) that the receiving channel has an oval cross section in one area of its axial extension which is located between a cross-sectional plane close to the insertion opening and the securing cams, and, if on the other hand, (b) that the receiving channel has an oval cross section in one section of its axial extension which lies between the securing cams and the end support. A certain ease of insertion can nevertheless be achieved if only requirement (a) or requirement (b) is met.

The deformation of the ball head-receiving channel by means of a compression in the direction of the long axes of the respective oval cross section can be performed the more easily if, in a longitudinal sectional plane containing the long axes of the oval cross sections, the wall thickness of the ball socket body between the interior circumferential surface of the receiving channel and the exterior surface of the ball socket body is less than in a longitudinal sectional plane containing the short axes of the oval cross sections.

A hard, elastic plastic is particularly suitable for manufacturing the ball socket body. Examples of this are polyamide and fiberglass-reinforced polyamide.

The ball socket body can have a connecting means for connecting with a connecting part, for example in the shape of a receiving hole for receiving a connecting tang. In the course of this, optimal application opportunities result if one axis of the receiving hole extends essentially orthogonally in respect to the channel axis. The receiving hole can be formed as a hole with an inner thread, into which a threaded tang is screwed which, if necessary, can be additionally secured by gluing.

In order to make the compressibility of the receiving channel in the direction of the long oval axes easier, and particularly to make the application of a clamping tool easier, it is recommended that the connecting means be located approximately in a longitudinal sectional plane containing the short axes of the oval cross section of the receiving channel.

Reduced friction on the end support of the receiving channel is achieved if the insertion boundary is formed by areas of a partial ball surface. This partial ball surface should, if possible, coincide in diameter with the diameter of the ball head.

It is also necessary to take into consideration the technical aspects of the injection molding production of the ball head-receiving channel. In particular, it must be taken into consideration that the ball socket body must be removed from the injection mold, even though the securing cams project into the ball head-receiving channel. Thus, it is not easily possible to obtain the total interior surface of the ball head-receiving channel by means of a one-piece injection tool.

The manufacturing problem is considerably eased if the partial ball surface areas are located in a projection along the channel axis outside of the securing cams. This is a basic requirement so that, on the one hand, the partial ball surface areas can be formed by an injection tool part which can be retracted in the pull-out direction during unmolding of the ball head, and that, on the other hand, the boundary surfaces of the securing cams oriented toward the back of the exterior surface of the ball socket body can be formed by an injection tool part which, after molding, can be retracted in the opposite direction from the first-mentioned injection tool part during unmolding, leaving behind a passage between the inner channel end and the back area of the exterior surface. In one geometry of the ball socket body that is particularly suited for injection molding, two securing cams are located diametrically opposite each other when considered in a cross-sectional plane, the partial ball surface areas are located outside a disk space which is essentially parallel to the channel axis and the boundary surfaces of which receive the securing cams between each other, the ball socket body is penetrated inside this disk space by a slit which connects the back of the exterior surface of the socket body with the receiving channel, inside of which the projection of the securing cams is open in the axial direction of the receiving channel toward the back of the exterior surface. In this case, the slit represents an opening which permits the application of a fastening tool. This again results in a synergistic effect in that, on the one hand, the slit makes possible the production of the ball socket body or at least makes it easier and, on the other, the slit permits the application of a fastening tool.

The slit is preferably formed to have an approximately rectangular cross section, which can be rounded on two oppositely located sides corresponding to the above mentioned rounded contour of the cams. It is advantageous for unmolding, if at least one pair, and preferably both pairs, of oppositely located slit boundary surfaces converge from the back of the exterior surface of the body in the direction towards the insertion opening of the ball-receiving channel. In the same way, it is advantageous from the view point of unmolding technology if the interior circumferential surface of the receiving channel is convergent from the insertion opening in the direction towards the interior channel end.

The invention further relates to a cylinder piston device, for example, a gas spring, with at least one ball-and-socket joint installed thereon as described hereinabove, for connecting the cylinder piston device to a generic structure, for example, a motor vehicle, with a pivot part pivotable around a horizontal axis.

The invention further relates to a method for connection of a ball-and-socket joint as described hereinabove, to a ball head support, wherein the fastening means of the ball head are brought into a fastening position in respect to the ball head support while gripping the ball socket body receiving the ball head, and wherein the ball head is then fastened on the ball head support, using a tool extending through the tool passage of the ball socket body.

This method can be employed in particular if the ball socket body has already been attached to a cylinder piston device, for example, a gas spring. In this case, it is possible to bring the fastening means of the ball head, while gripping the cylinder or the piston rod of the cylinder piston device and with the aid of the ball socket body fastened on the cylinder or the piston rod and receiving the ball head, into a fastening position with respect to the ball head support attached to the generic structure. Subsequently, the ball head is fastened on the ball head support by employing a tool extending through the passage in the ball socket body. This method has been shown to be particularly advantageous if the spatially restricted conditions at the place of installation, on a motor vehicle for example, make it difficult to position the isolated ball head relative to the preassembled ball head support in such a way that it subsequently is easily possible to fasten the ball head to the ball head support by means of a fastening tool.

Finally, the invention relates to a method for assembling a ball-and-socket joint as described hereinabove, wherein the ball socket body is elastically compressed along a longitudinal center plane crosswise to the ball-receiving channel axis, which longitudinal center plane is located orthogonally with respect to a longitudinal center plane containing a securing cam, and wherein, during the state of elastic compression of the ball socket body, the ball head is inserted past the securing cam into the receiving channel. By means of the step of elastic compression it is possible to increase the clear width of the channel in the longitudinal center plane including the securing cam in such a way that the ball head can be inserted into the receiving channel freely or at least with greater ease. Then upon removal of the elastic compression, the ball head is seated securely in the receiving channel against separating forces.

Once the ball head has been inserted into the ball head-receiving channel, it can either be capable of easy rotation or wobbling or it can be fixed against rotation or wobbling by means of frictional forces to such a degree that it maintains its position once set manually, as long as it is not subject to greater deflection forces. The decision whether to seat the ball head in the ball head-receiving channel freely rotatable and able to wobble, or whether it rests against it under friction, depends on the respective use. If the object is to pre-orient the ball head within the ball head-receiving channel for subsequent fastening to a ball head support or to maintain it in a position which can be easily reached by a fastening tool, it is recommended to permit the ball head to rest under friction in the ball head-receiving channel, thus remaining in the respectively attained position.

BRIEF DESCRIPTION OF THE DRAWINGS

An illustrative embodiment of the invention is shown in the attached drawings, in which:

FIG. 9 shows the progression of steps during the installation on a motor vehicle body of a gas spring with a ball-and-socket joint fastened thereon.

DETAILED DESCRIPTION

Figure 1:
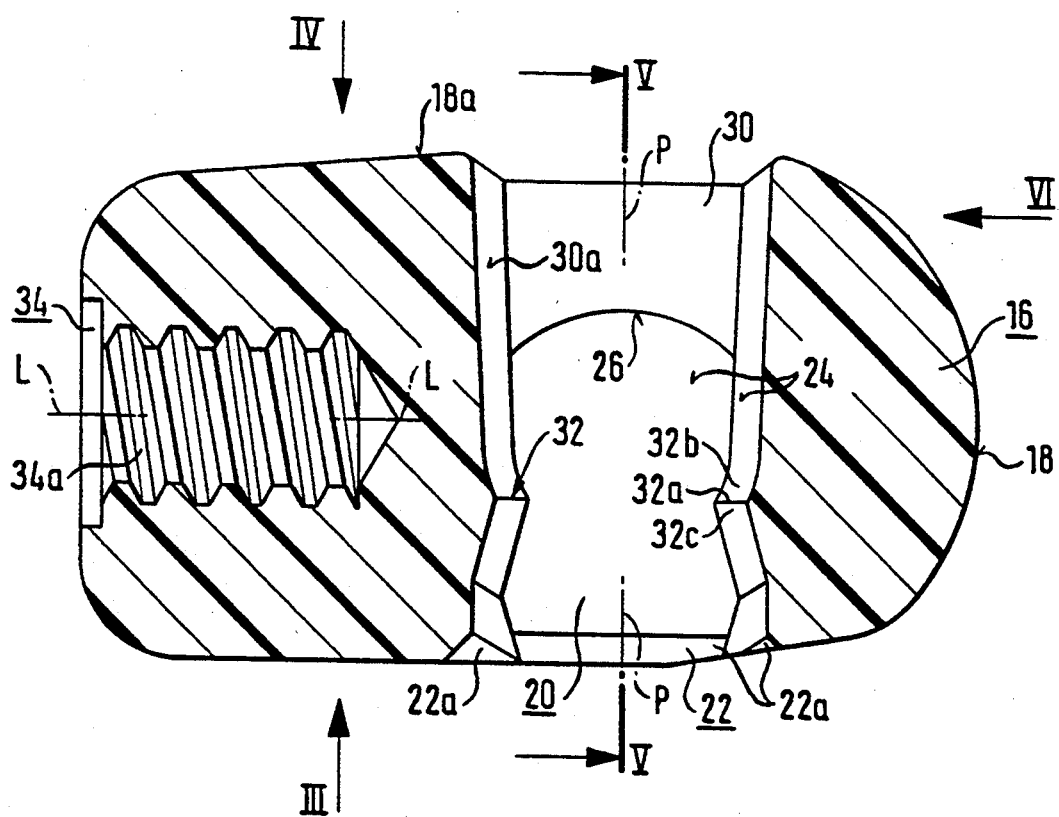
FIG. 1 is an expanded view of a ball-and-socket joint prior to assembly of the ball head and the ball socket body, in longitudinal section through the ball socket body and with parts broken away for clarity.
Figure 1:
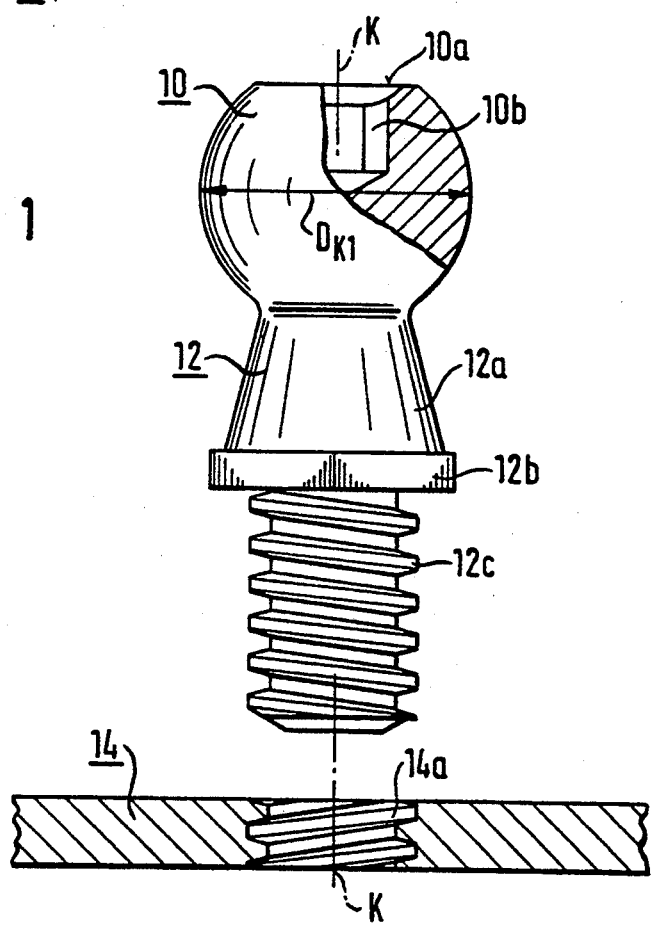
Figure 2:
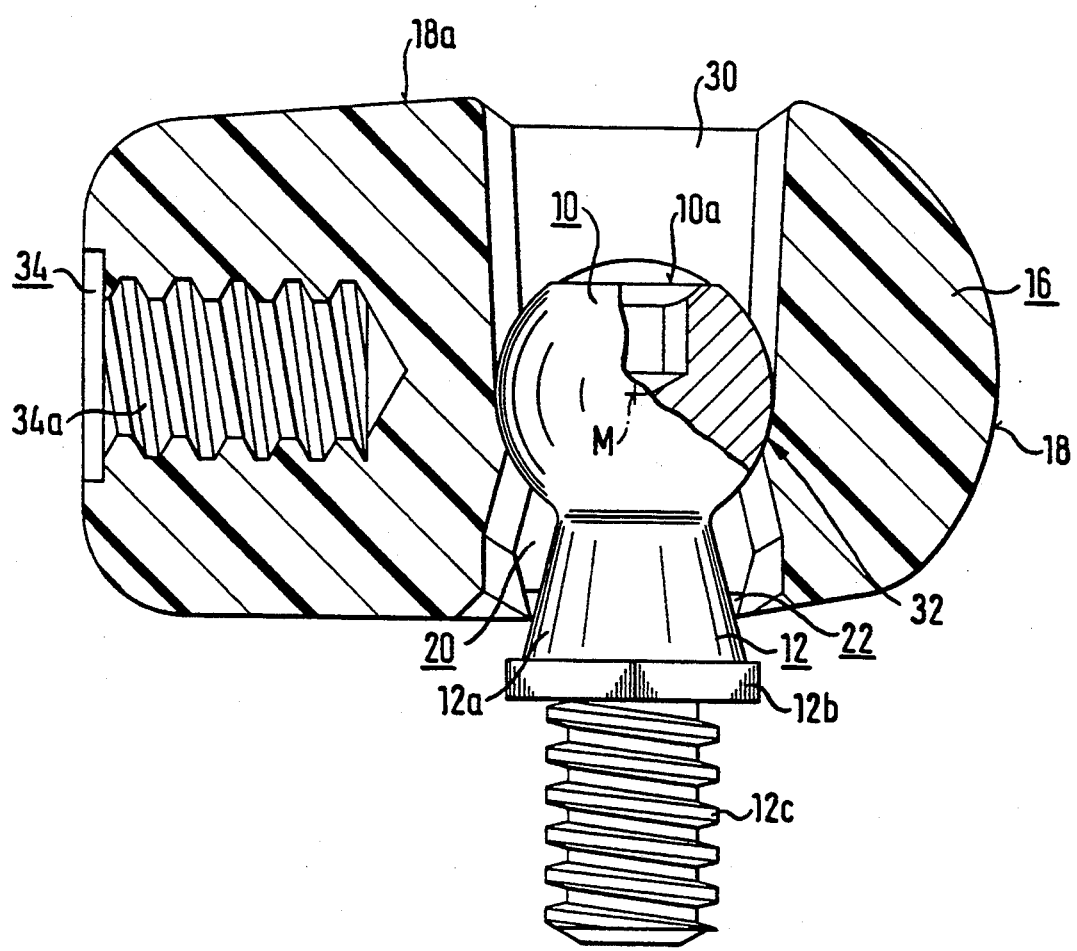
FIG. 2 a longitudinal section through the ball socket body in accordance with FIG. 1 showing the ball-and-socket joint in the assembled condition.

A ball head is indicated by 10 in FIGS. 1 and 2. This ball head 10 is manufactured in one piece with a ball head shaft 12 which is first, following the ball head 10, embodied with a frustoconically-shaped section 12a, following that with a hexagonal engagement surface 12b for a wrench and again following that with an externally threaded section 12c, by means of which the ball head 10 can be fastened on a ball head support 14, which has an interior thread 14a corresponding to the threaded section 12c.

The ball head has a central axis K—K, which coincides with the axis of the ball head shaft 12. On its upper end and located orthogonally with respect to the axis K—K, the ball head 10 is provided with a flattened area 10a, in the center of which a hexagonal hole or a Torx hole 10b has been cut for the engagement of a rotating tool.

Figure 4:
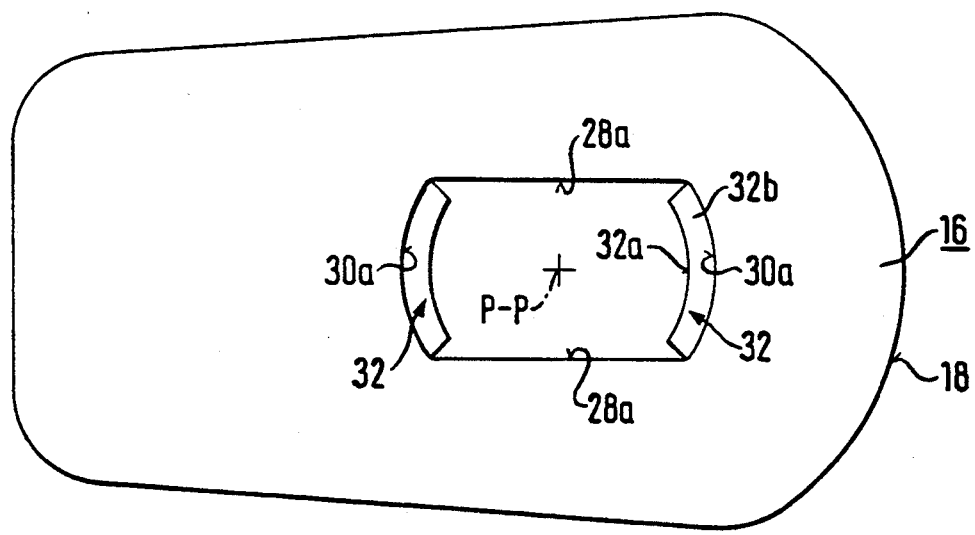
FIG. 4 a top view of the ball socket body in the direction of the arrow IV of FIG. 1 prior to installation of the ball head.

A ball socket body indicated by 16 can furthermore be seen in FIG. 1. This ball socket body consists of a hard, elastic plastic material, preferably a fiber-loaded polyamide, and has been produced in accordance with an injection molding process. The ball socket body 16 has an exterior surface 18 with a back 18a and a ball head-receiving channel 20. The ball head-receiving channel 20 has a longitudinal axis P—P and an interior circumferential surface 24. The inner, i.e. in FIG. 1 the top, end of the ball head-receiving channel 20 is formed by two partially ball-shaped surface areas 26, which can be seen particularly in FIG. 5. These partially ball-shaped surface areas 26 are separated from each other by a virtual space disk 28, limited by two disk boundary surfaces 28a which are approximately parallel to each other in principle. The disk boundary surfaces 28a are shown in FIG. 5 with a slight downward convergence, which is described more fully hereinafter. A passage 30 follows the receiving channel 20 at the top towards the back 18a and is limited on the one side by the disk boundary surfaces 28a and on the other by rounded lateral surfaces 30a (FIG. 4).

Starting at the interior circumferential surface 24 in FIG. 1, two securing cams 32 located diametrically opposite from each other project into the receiving channel 20. Each of these securing cams has a profile tip 32a which, in a cross section located orthogonally to the axis P—P, is embodied with a contour in the shape of a partial circle, as can be seen in FIG. 4. The diameter of this contour in the shape of a partial circle is a little less than the diameter of the ball head 10. A respective concave profile section 32b follows the profile tip 32a at the top, in which case the radius of curvature of this concave profile section 32b, seen in the longitudinal section of FIG. 1, again approximately corresponds to the radius of the ball head 10.

A ball run-up ramp 32c follows the profile tip 32a at the bottom. The ball insertion opening 22 is also made with a ball insertion ramp 22a.

Figure 7:
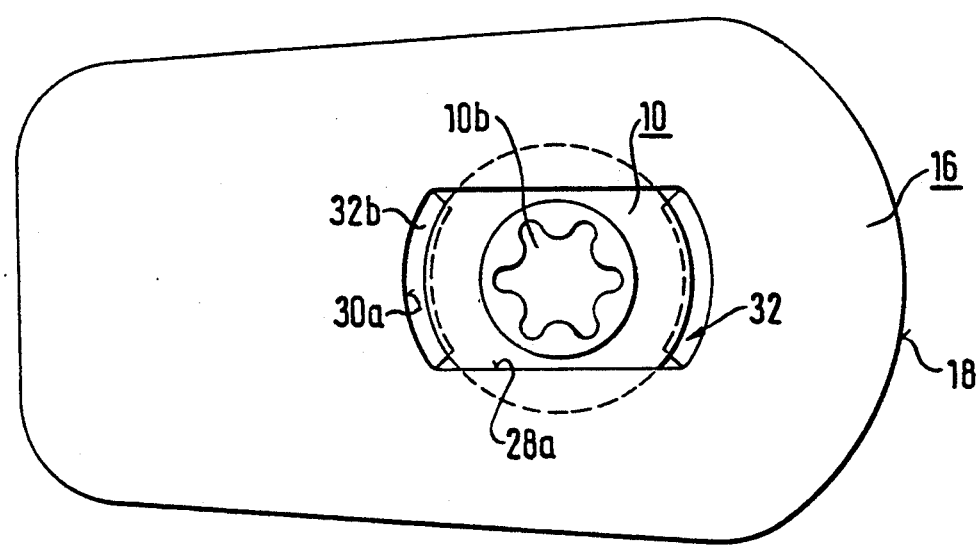
FIG. 7 a top view of the ball socket body similar to FIG. 4, but with the ball head inserted.

In the assembled state in accordance with FIGS. 2 and 7, the securing cams 32 grip the ball head 10 from behind. For this reason the ball head can only be pulled out of the receiving channel 20 by exerting a large separation force. Because the ball head rests against the partially ball-shaped profile section 32b and because the ball head shaft 12 has a smaller diameter at the height of the insertion opening 22 than the insertion opening itself, the ball socket body 16 is rotatable around the axis P—P with respect to the ball head and is also able to wobble in such a way that the axis P—P can be tilted in respect to the axis K—K in all longitudinal sectional planes containing the axis K—K.

The ball socket body 16 is provided with a receiving hole 34, which is provided with an interior thread 34a. The ball socket body can be screwed on an add-on piece by means of this receiving hole, for example on a threaded end stem of a piston rod. The longitudinal axis of the hole 34 is indicated by L—L and is located essentially orthogonally to the socket axis P—P.

The passage 30 is of importance for the production of the securing cams 32 in the course of the manufacture of the ball socket body 16 by means of injection molding technology. This passage can be produced by means of a movable mold die of the mold constituting the molding chamber for producing the ball socket chamber 16 and which has in its lower end area molding surfaces for producing the concave profile areas 32b. On the other hand it is possible to obtain the partially ball-shaped surface areas 26 of FIG. 5 and the ball run-up ramps 32c (FIG. 1) in the course of production of the ball socket body by means of a mold part which can be retracted downward out of the ball socket body 16 after the injection process. In this way, unmolding of the ball socket body 16 at the end of the injection process poses no difficulties. The removal of the mold die from the passage 30 is additionally made easier because of the downward convergent disposition of the disk boundary surfaces 28a.

Figure 3A:
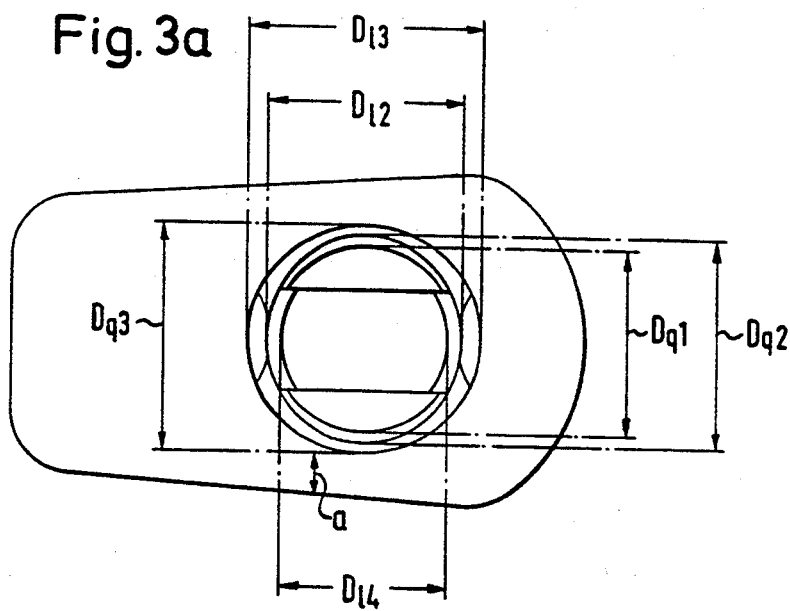
FIG. 3a a top view in accordance with FIG. 3 with dimensioning information.
Figure 1A:
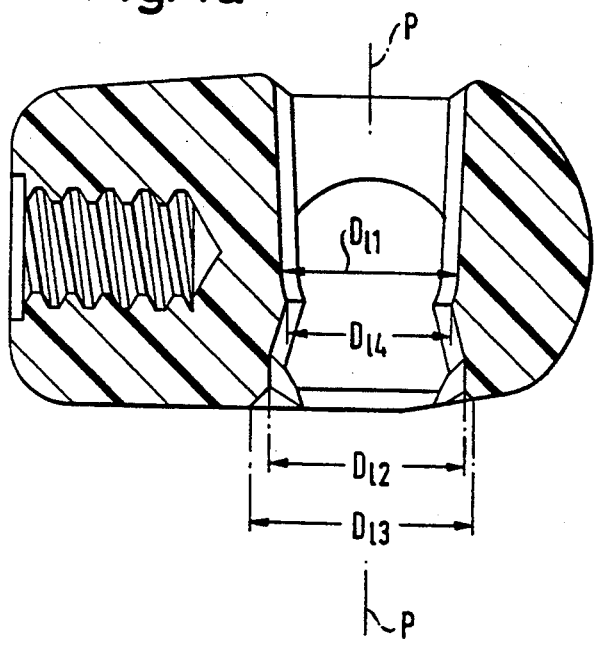
FIG. 1a is a longitudinal section through the ball socket body in accordance with FIG. 1 with dimensioning information.
Figure 5A:
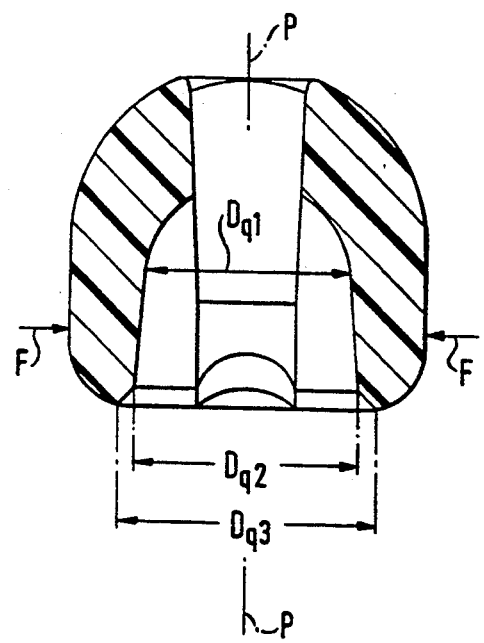
FIG. 5a a section in accordance with FIG. 5 with dimensioning information.
Figure 3:
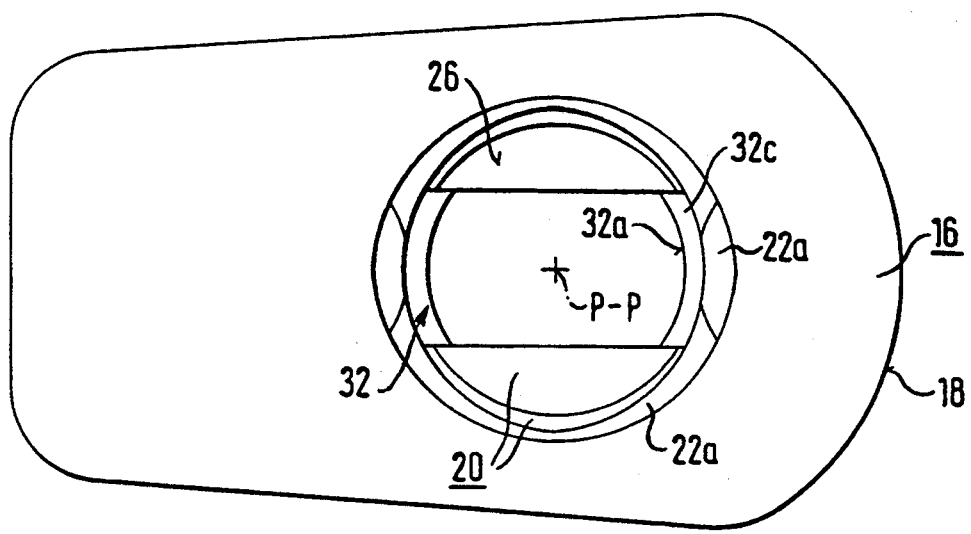
FIG. 3 view from below in the direction III of FIG. 1 of the ball socket body prior to installation of the ball head.
Figure 5:
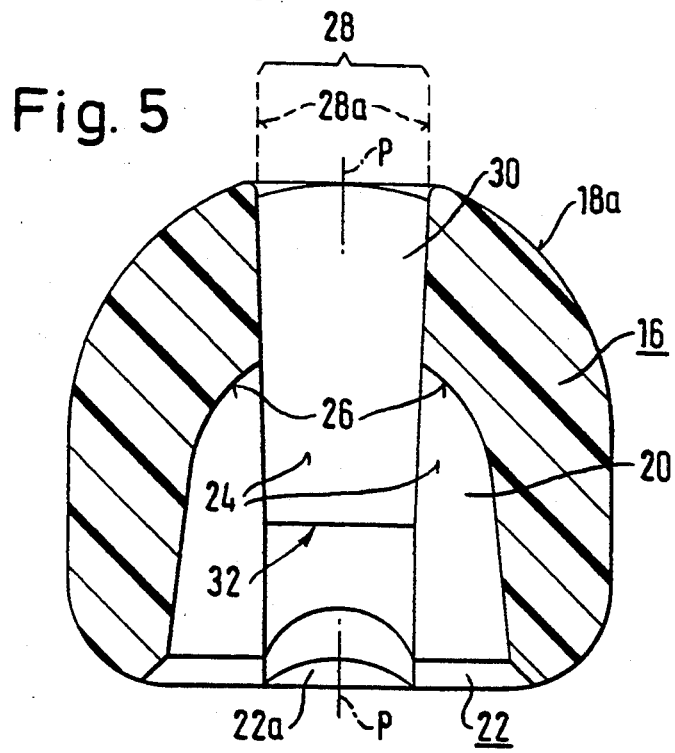
FIG. 5 a longitudinal section through the ball socket body in the direction of the arrow V—V of FIG. 1.
Figure 6:
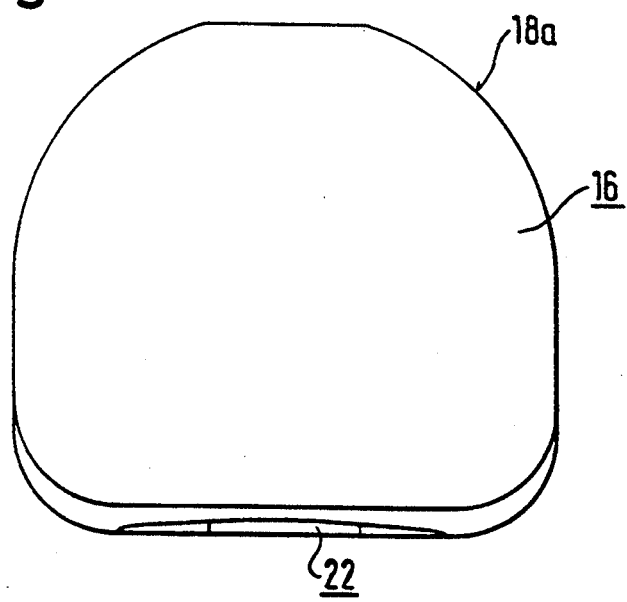
FIG. 6 an end view of the ball socket body in the direction of the arrow VI of FIG. 1.

The representations of FIGS. 1, 3 and 5 are repeated in FIGS. 1a, 3a and 5a. The dimensions of the diameters indicated in these drawings are as follows:

$D_{11}$ is the diameter of the receiving channel in the longitudinal sectional plane of FIG. 1a at the upper end of the securing cam 32, i.e. at the upper end of the concave profile area 32b;

$D_{12}$ is the receiving channel diameter, again in longitudinal section in accordance with FIGS. 1, 1a in the lower end section of the receiving channel just above the insertion ramp 22a;

$D_{13}$ is the diameter of the receiving channel, again in longitudinal section in accordance with FIGS. 1 and 1a at the lower, widened end of the insertion ramp 22a;

$D_{14}$ is the minimum distance between the securing cams 32, again in longitudinal section in accordance with FIGS. 1 and 1a at the height of a cross-sectional plane containing the profile tips 32a;

$D_{q1}$ is the diameter of the receiving channel in a cross-sectional plane in accordance with FIGS. 5, 5a above the securing cams 32 (at the same height at which the diameter D11 is also drawn), approximately at the height of the ball center M of the ball head 10 when completely inserted in the receiving channel in accordance with FIG. 2;

$D_{q2}$ is the diameter of the receiving channel cross section at the transition to the insertion ramp 22a (at the same height at which the diameter D11 is also measured);

$D_{q3}$ the diameter in the longitudinal cross-sectional plane in accordance with FIGS. 5 and 5a at the lower, widened end of the insertion ramp 22a; and $D_{k1}$ is the diameter of the ball head 10 as shown in FIG. 1.

The following inequalities apply to the relations of the respective diameters:

$D_{11} < D_{k1} < D_{q1}$
$D_{12} < D_{q2}$
$D_{13} \approx D_{q3}$
$D_{14} < D_{11}$ The individual quantities in these inequalities have the meanings indicated above.

It can be seen from the above inequalities that, as also represented in FIG. 3a, the receiving channel is oval in cross-sectional planes placed above each other along the axis P—P, wherein the long axes of the oval cross sections $D_{q1}$ and $D_{q2}$ are located in the longitudinal cross-sectional planes containing the axis P—P in accordance with FIGS. 5 and 5a, while the short axes of the oval cross sections $D_{11}$, $D_{12}$ are located in the longitudinal cross-sectional planes containing the channel axis P—P in accordance with FIGS. 1 and 1a.

In FIG. 3a, it should be noted that the wall thickness a of the ball socket body between the receiving channel 20 and the exterior surface 18 in the cross-sectional plane corresponding to the long oval cross-sectional axes $D_{q1}$ and $D_{q2}$ is relatively slight. From the above recited inequalities, it should be further noted that the long oval cross-sectional diameter $D_{q1}$ is greater than the ball head diameter $D_{k1}$. This means that by applying a clamping force FF in the longitudinal sectional plane in accordance with FIGS. 5 and 5a, the receiving channel can be reduced by bringing the circumferential surface areas located in this longitudinal sectional plane closer together, which necessarily results simultaneously in an enlargement of the short oval cross-sectional axes $D_{11}$ and $D_{14}$. In such a state of elastic deformation, it is possible to insert the ball head 10 in the ball head-receiving channel 20 without use of force or with a small force. After the ball head 10 rests against the partially ball-shaped surface areas 26, the clamping force FF is removed again. The securing cams 32 then snap together in the sense of a mutual approach and grip the ball head 10 from behind, so that it can no longer be pulled out of the ball head-receiving channel 20.

Figure 8:
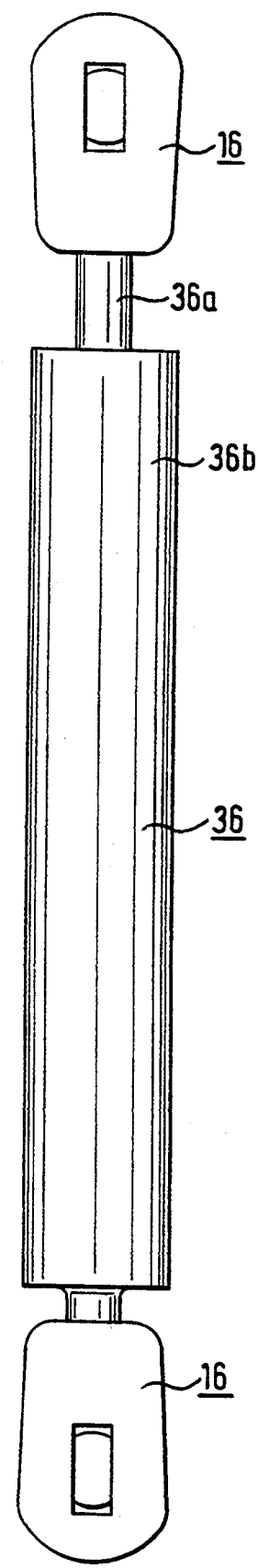
FIG. 8 a gas spring with ball socket bodies fastened to the piston rod and to the cylinder.

FIG. 8 shows a gas spring 36, on the piston rod 36a and cylinder 36b of which a ball socket body 16 is respectively screwed at opposite ends. The ball socket bodies 16 can be pushed on the ball heads, if necessary with the help of a compression tool which can move the securing cams in the receiving channel in opposite directions. If one of the ball heads is fastened to a generic structure, the gas spring is connected rotatably and able to wobble relative to the structure after the insertion of the ball head into the ball socket body and, if required, after removal of the compression tool.

A ball-and-socket joint has been attached in FIG. 9 to the piston rod 36a of the gas spring 36. This can be seen because the ball head 10 was pre-assembled in the ball socket body 16, as shown in FIG. 2.

Assembly of the gas spring 36 on a generic structure 40 can be performed in a simple manner as follows:

The threaded section (12c in FIG. 1) of the ball head 10 is brought into the angular position relative to the ball socket body 16 preferred for assembly. The gas spring 36 is held in one hand 42 and brought into a position in which the threaded section (12c in FIG. 1) of the ball head 10 rests against the interior thread 14a of a ball head support 14 disposed on the generic structure 40.

The other hand 44 holds an electrical rotating tool 38 which can now be inserted into the tool application point 10b of the ball head 10 in a simple manner. By rotating the ball head 10 in the ball socket body 16, the threaded section (12c in FIG. 1) of the ball head 10 is screwed into the interior thread 14a. If need be, the threaded section (12c in FIG. 1) may be further aligned with the interior thread 14a by pivoting the rotating tool 38.

Removal of the gas spring 36 from the generic construction 40 can take place either by removing the screw connection "ball head—ball head support" by means of the rotating tool, or by pulling the ball socket body 16 off the ball head 10, if necessary with the aid of a compression tool.

If lesser separation forces are acceptable, it is also possible to lock the ball socket body 16 to the ball head 10 by pressure, in particular a hammer blow.

With all embodiments of the invention, a close fit of the ball head in the ball socket body is possible, so that rattling between the ball socket body and the ball head is prevented.

We claim:

1. A ball-and-socket joint, comprising:
   a ball head;
   means for fastening the ball head to a ball head support, said fastening means including tool engagement means for engagement by a fastening tool to fasten the ball head to the ball head support;
   a ball socket body for receiving the ball head in a rotatable manner, said ball socket body having an exterior surface and a ball-receiving channel, the receiving channel having a channel axis (P—P), an insertion opening for insertion of the ball head, an interior circumference surface for the ball head to rest on, an interior end support defining an insertion boundary for the ball head and securing means which secure the ball head against being pulled out from the receiving channel;
   said ball socket body further having a passage which connects the receiving channel with an area of the exterior surface of the ball socket body which is remote from the insertion opening; and
   said tool engagement means being accessible to a fastening tool through said passage for fastening the ball head on said ball head support.

2. A ball-and-socket joint in accordance with claim 1, wherein the passage connects the receiving channel in the area of the channel axis (P—P) with the back of the exterior surface of the ball socket body remote from the insertion opening.

3. A ball-and-socket joint in accordance with claim 2, wherein:
   the fastening means includes means for fastening the ball head to the ball head support by means of a rotating movement; and
   the tool engagement means is configured for engagement by a rotating tool.

4. A ball-and-socket joint in accordance with claim 3, wherein:
   the ball head includes a ball head shaft and the fastening means comprises a fastening thread over at least a portion of the length of the ball head shaft, for screwing into a counter-thread of the ball head support; and
   the tool engagement means for application of the rotary tool is located on the ball head substantially on the axis area (K—K) of the ball head shaft.

5. A ball-and-socket joint in accordance with claim 4, wherein the tool engagement means for application of the rotary tool comprises a hexagonal or Torx connection.

6. A ball-and-socket joint unit in accordance with claim 1, wherein:
   the securing means includes at least one securing cam integral with the ball socket body;
   said securing cam begins at the interior circumferential surface of the receiving channel, grips the ball head from behind and is elastically movable from said gripping position to permit passage of the ball head when it is inserted into the receiving channel.

7. A ball-and-socket joint, comprising:
   a ball head adapted to be fastened by fastening means to a ball head support;
   a ball socket body for receiving the ball head in a rotatable manner, said ball socket body having an exterior surface and a receiving channel, said receiving channel having a channel axis (P—P), an insertion opening for insertion of the ball head, an interior circumference surface for the ball head to rest on, an interior end support defining an insertion boundary for the ball head and securing means for securing the ball head against being pulled out from the receiving channel;
   said securing means including at least one securing cam integrally formed with the ball socket body, said securing cam beginning at the interior circumferential surface of the receiving channel, gripping the ball head from behind and being elastically movable from said gripping position to permit passage of the ball head when it is inserted into the receiving channel.

8. A ball-and-socket joint in accordance with claim 7, wherein said securing means includes two securing cams located diametrically opposite each other in a cross-sectional plane which is orthogonal to the channel axis (P—P).

9. A ball-and-socket joint in accordance with claim 7, wherein said at least one securing cam has a concave contour towards the channel axis (P—P) at least in the area of a cross-sectional plane which is orthogonal to the channel axis (P—P) and located at the point of closest approach of the securing cam (32) to the channel axis (P—P).

10. A ball-and-socket joint in accordance with claim 9, wherein said securing cam, considered in a longitudinal sectional plane containing the channel axis (P—P)

and located at a central place of the circumferential extension of the securing cam around the channel axis (P—P), is provided with a profile tip pointing towards the channel axis (P—P).

11. A ball-and-socket joint in accordance with claim 10, wherein the securing cam, considered in said longitudinal sectional plane, is concave towards the channel axis (P—P) in a profile area extending in the direction toward the end support which follows the profile tip.

12. A ball-and-socket joint in accordance with claim 10, wherein the securing cam, considered in said longitudinal sectional plane, is embodied with a ball run-up ramp in a profile area extending in the direction toward the insertion opening which follows the profile tip.

13. A ball-and-socket joint in accordance with claim 1 or 7, wherein the insertion opening is formed with an insertion ramp on at least a portion of its circumference.

14. A ball-and-socket joint in accordance with claim 8, wherein the receiving channel, considered in a cross sectional plane orthogonal to the channel axis (P—P), has an oval cross section over at least a portion of its axial extension, wherein a short axis ($D_{11}$, $D_{12}$) of the respective oval cross section lies in a longitudinal sectional plane containing the channel axis (P—P) and intersecting the securing cams, and wherein the long axis ($D_{q1}$, $D_{q2}$) of the respective oval cross section is larger than the diameter ($D_{k1}$) of the ball head.

15. A ball-and-socket joint in accordance with claim 14, wherein the receiving channel has oval cross sections ($D_{11}$, $D_{q2}$) in an area of its axial extent which is located between a cross-sectional plane near the insertion opening and the securing cams.

16. A ball-and-socket joint in accordance with claim 14, wherein the receiving channel has oval cross sections ($D_{11}$, $D_{q1}$) in an area of its axial extent which extends between the securing cams and the end support.

17. A ball-and-socket joint in accordance with claim 14, wherein in a longitudinal sectional plane containing the long axes ($D_{q1}$, $D_{q2}$) of the oval cross sections, the wall thickness (a) of the ball socket body between the interior circumferential surface of the receiving channel and the exterior surface of the ball socket body is less than in a longitudinal sectional plane containing the short axes ($D_{11}$, $D_{12}$) of the oval cross-sections.

18. A ball-and-socket joint in accordance with claim 1 or 7, wherein the ball socket body comprises a hard, elastic plastic material.

19. A ball-and-socket joint in accordance with claim 18, wherein the ball socket body consists of one or more of polyamide and fiberglass-reinforced polyamide.

20. A ball-and-socket joint in accordance with claim 1, wherein the ball socket body has a connection means for connection with a connecting part.

21. A ball-and-socket joint in accordance with claim 20, wherein the connection means is constituted by a receiving hole for receiving a connecting pin.

22. A ball-and-socket joint in accordance with claim 21, wherein the receiving hole has a longitudinal axis (L—L) which extends substantially orthogonally with respect to the channel axis (P—P).

23. A ball-and-socket joint in accordance with claim 21, wherein the receiving hole is formed as a hole with an inner thread.

24. A ball-and-socket joint in accordance with claim 14, wherein the ball socket body has a connection means for connection with a connecting part, said connection means being located approximately in a longitudinal sectional plane containing the short axis ($D_{11}$, $D_{12}$) of the oval cross section.

25. A ball-and-socket joint in accordance with claim 1 or 7, wherein the insertion boundary is formed by at least one partial area of a hollow spherical surface.

26. A ball-and-socket joint in accordance with claim 25, wherein said partial area is are located in a projection along the channel axis (P—P) outside of the securing cams.

27. A ball-and-socket joint in accordance with claim 26, wherein:
the securing means includes two securing cams located diametrically opposite each other when considered in a cross-sectional plane, the partial areas are located outside a disk space which is essentially parallel to the channel axis (P—P), and the boundary surfaces of said disk space receive the securing cams therebetween; and
the ball socket body is penetrated inside the disk space by a slit which connects the back of the exterior surface with the receiving channel, inside of which slit the projection of the securing cams is open in the axial direction (P—P) of the receiving channel toward the back of the exterior surface.

28. A method for connecting a ball-and-socket joint to a head support, said ball-and-socket joint including a ball head, means for fastening the ball head to said ball head support, said fastening means including tool engagement means for engagement by a fastening tool to fasten the ball head to the ball head support, a ball socket body for receiving the ball head in a rotatable manner, said ball socket body having an exterior surface and a ball-receiving channel, the receiving channel having a channel axis (P—P), an insertion opening for insertion of the ball head, an interior circumference surface for the ball head to rest on, an interior end support defining an insertion boundary for the ball head, securing means which secure the ball head against being pulled out from the receiving channel, a passage in said ball socket body which connects the receiving channel with an area of the exterior surface of the ball socket body which is remote from the insertion opening, said tool engagement means being accessible to a fastening tool through said passage for fastening the ball head on said ball head support; said method comprising the steps of:
inserting the ball head into the insertion opening of the ball socket body such that said securing means secures the ball head therein;
bringing the fastening means into a fastening position relative to the ball head support while gripping the ball socket body with the ball head secured therein; and
fastening the ball head to the ball head support using a fastening tool extending through the passage of the ball socket body and engaging said tool engagement means.

29. A method for connecting a cylinder-piston device having a piston member and a cylinder member to a structural unit, at least one of the piston member and the cylinder member being provided with a ball-and-socket joint which includes a ball head, means for fastening the ball head to a ball head support carried by the structural unit, said fastening means including tool engagement means for engagement by a fastening tool to fasten the ball head to the ball head support, a ball socket body connected to one of the cylinder member and the piston rod member for receiving the ball head in a rotatable manner, said ball socket body having an exterior surface and a ball-receiving channel, the receiving channel having a channel axis (P,—P), an insertion opening for insertion of the ball head, an interior circumference surface for the ball head to rest on, an interior end support defining an insertion boundary for the ball-head, securing means which secure the ball head against being pulled out from the receiving channel, said ball socket body further having a passage which connects the receiving channel with an area of the exterior surface of the ball socket body which is remote from the insertion opening, said tool engagement means being accessible to a fastening tool through said passage for fastening the ball head on said ball head support; said method comprising the steps of:

inserting the ball head into the insertion opening of the ball socket body such that said securing means secures the ball head therein;

bringing the fastening means of the ball head into a fastening position relative to the ball head support carried by the structural unit while gripping one of the cylinder member and the piston rod member of the cylinder piston device with the ball socket body connected to said one of the cylinder member and the piston rod member and with the ball head secured in the ball socket body; and fastening the ball head to the ball head support by employing a tool extending through the passage of the ball socket body and engaging said tool engagement means.

30. A method for assembling a ball-and-socket joint including a ball head which can be fastened by fastening means to a ball head support and a ball socket body for receiving the ball head in a rotatable manner, said ball socket body having an exterior surface and a ball-receiving channel, the receiving channel having a channel axis (P—P), an insertion opening for insertion of the ball head, an interior circumference surface for the ball head to rest on, an interior end support defining an insertion boundary for the ball head and securing means, including at least one securing cam, for securing the ball head against being pulled out from the receiving channel; said method comprising the steps of:

elastically compressing the ball socket body along a longitudinal center plane (F—F) crosswise to the channel axis (P—P), said longitudinal center plane (F—F) being located orthogonally with respect to a longitudinal center plane containing said securing cam; and inserting the ball head past said securing cam into the receiving channel of the ball socket body during said elastic compression of the ball socket body.

31. A ball socket body for receiving in a rotatable manner a ball head of a ball-and-socket joint, said ball socket body comprising:

an exterior surface and a ball-receiving channel, the ball-receiving channel having a channel axis (P—P);

an insertion opening for insertion of the ball head;

an interior circumference surface for the ball head to rest on;

an interior end support defining an insertion boundary for the ball head;

securing means which secure the ball head against being pulled out from the receiving channel; and a tool access passage which connects the receiving channel with an area of the exterior surface of the ball socket body which is remote from the insertion opening, whereby a tool may be inserted through said passage to fasten the ball head on said ball head support.

32. In a ball-and-socket joint for a cylinder-piston unit including a cylinder member and a piston rod member, the improvement comprising:

a ball head which can be fastened by fastening means to a ball head support;

a ball socket body fastened to one of the cylinder member and the piston rod member for receiving the ball head in a rotatable manner, said ball socket body having an exterior surface and a ball-receiving channel, the receiving channel having a channel axis (P—P), an insertion opening for insertion of the ball head, an interior circumference surface for the ball head to rest on, an interior end support defining an insertion boundary for the ball head and securing means which secure the ball head against being pulled out from the receiving channel;

said ball socket body further having a passage which connects the receiving channel with an area of the exterior surface of the ball socket body which is remote from the insertion opening; and tool engagement means in operative connection with said fastening means at a location accessible to a fastening tool through said passage for fastening the ball head on said ball head support.

33. In a ball socket body for receiving in a rotatable manner a ball head of a ball-and-socket joint for a cylinder-piston unit including a cylinder member and a piston rod member, the ball socket body being connected to one of said cylinder member and said piston rod member, the improvement in said ball socket body comprising:

an exterior surface and a ball-receiving channel, the ball-receiving channel having a channel axis (P—P);

an insertion opening for insertion of the ball head;

an interior circumference surface for the ball head to rest on;

an interior end support defining an insertion boundary for the ball head;

securing means which secure the ball head against being pulled out from the receiving channel; and a tool access passage which connects the receiving channel with an area of the exterior surface of the ball socket body which is remote from the insertion opening, whereby a tool may be inserted through said passage for engagement with the ball head to fasten the ball head on said ball head support.

* * * * *

Disclaimer

5,409,320 — Horst Maury, St. Sebastian; Dieter Henke, Hankensbuttel, both of Germany. BALL-AND-SOCKET JOINT AND METHOD FOR THE ASSEMBLY THEREOF. Patent dated April 25, 1995. Disclaimer filed Nov. 26, 1996, by the assignee, Stabilus GmbH.

Hereby enters this disclaimer to claims 1, 2, 3, 4, 5, 20, 21, 22, 23, 25, 28, 29, 31, 32 and 33 of said patent.

*(Official Gazette, April 22, 1997)*